(12) United States Patent
Böhm et al.

(10) Patent No.: US 8,680,949 B2
(45) Date of Patent: Mar. 25, 2014

(54) NETWORK FILTER FOR A CONVERTER FOR CONNECTION OF THE CONVERTER TO A 3-PHASE SUPPLY NETWORK

(75) Inventors: Alfred Böhm, Gunzenhausen (DE); Tobias Hofmann, Forchheim (DE); Rommy Böhm, legal representative, Gunzenhausen (DE); Florian Böhm, legal representative, Muhr am See (DE)

(73) Assignee: Siemens Aktiengesellschaft, München (DE)

( * ) Notice: Subject to any disclaimer, the term of this patent is extended or adjusted under 35 U.S.C. 154(b) by 639 days.

(21) Appl. No.: 12/599,884

(22) PCT Filed: May 8, 2008

(86) PCT No.: PCT/EP2008/055703
§ 371 (c)(1),
(2), (4) Date: Jan. 24, 2011

(87) PCT Pub. No.: WO2008/138863
PCT Pub. Date: Nov. 20, 2008

(65) Prior Publication Data
US 2011/0156833 A1    Jun. 30, 2011

(30) Foreign Application Priority Data
May 14, 2007    (DE) .......................... 10 2007 022 503

(51) Int. Cl.
*H03H 7/00*    (2006.01)
*H03H 7/21*    (2006.01)

(52) U.S. Cl.
USPC .......................................... 333/181; 333/177

(58) Field of Classification Search
USPC .................... 333/12, 172, 177, 181; 307/105; 363/34, 40, 44, 45, 47
See application file for complete search history.

(56) References Cited

U.S. PATENT DOCUMENTS 7,453,330 B2 * 11/2008 Beil et al. ...................... 333/181
7,561,008 B2 *  7/2009 Lucas ............................ 333/181

FOREIGN PATENT DOCUMENTS

| DE | 298 00 567 U1 | 4/1998 |
| DE | 10 2005 005 688 A1 | 8/2006 |
| EP | 1 069 673 A1 | 1/2001 |
| EP | 1 096 634 A2 | 5/2001 |

(Continued)

OTHER PUBLICATIONS

Anwendungshinwelse zu Funkentatördrossein für EMV-Netzfilter mit Ringbandkemen aus VITROPERM 500F; 1998; hrag. von VAC Vakuumschmelze GmbH, Hanau, DE; Others: 1998.

*Primary Examiner* — Dean O Takaoka
(74) *Attorney, Agent, or Firm* — Henry M. Feiereisen LLC

(57) ABSTRACT

A network filter for connecting a converter to a 3-phase supply network includes in each phase a toroidal inductor which is connected in series with a commutation inductor at a respective first connection point, and a capacitor circuit having at least four capacitances, wherein first terminals of a first, a second and a third capacitance is connected in one-to-one correspondence to a respective one of the first connection points. Second terminals of the first, second and third capacitance are connected at a common second connection point, with a fourth capacitance being connected between ground and the common second connection point. The windings of the toroidal inductors can be formed of the connecting lines which connect the corresponding first terminals to the three phases of the supply network.

8 Claims, 1 Drawing Sheet

(56) References Cited

FOREIGN PATENT DOCUMENTS

| | | |
|---|---|---|
| JP | 62-171462 A | 7/1987 |
| JP | 2600-340437 A | 12/2000 |
| JP | 2001244770 A | 9/2001 |
| JP | 2005204438 A | 7/2005 |
| WO | WO 96/24983 A1 | 8/1996 |
| WO | WO 03/105328 A1 | 12/2003 |

* cited by examiner

NETWORK FILTER FOR A CONVERTER FOR CONNECTION OF THE CONVERTER TO A 3-PHASE SUPPLY NETWORK

CROSS-REFERENCES TO RELATED APPLICATIONS

This application is the U.S. National Stage of International Application No. PCT/EP2008/055703, filed May 8, 2008, which designated the United States and has been published as International Publication No. WO 2008/138863 and which claims the priority of German Patent Application, Serial No. 10 2007 022 503.4, filed May 14, 2007, pursuant to 35 U.S.C. 119(a)-(d).

BACKGROUND OF THE INVENTION

The invention relates to a network filter for a converter, which can be connected to a 3-phase supply network.

In general, network filters are electrical circuits which are intended remove or at least greatly limit electrical disturbances to electronic appliances from the public supply network. A further aim is to improve the so-called electromagnetic compatibility of electrical appliances to withstand disturbances from the electrical power supply network.

For this purpose, in the case of converters from the prior art, it is known, for example, for a so-called commutation inductor to be provided, which is connected in the phases of the supply network and connects the supply network to a feed module for the converter. An asymmetrically acting inductance such as this in the network branches limits disturbances caused in particular by the switching elements in the power section of the converter such that these at least cannot react fully on the supply network.

SUMMARY OF THE INVENTION

The invention is based on the object of specifying an improved network filter for a converter for connection of the converter to a 3-phase supply network. The aim in this case is, in particular, to improve the suppression characteristics in comparison to the prior art, with the aim of creating an embodiment which is as simple as possible.

According to the invention, the object is achieved by a network filter for a converter for connection of the converter to a 3-phase supply network, comprising:
one toroidal inductor per phase, connected in series with a commutation inductor of the converter; and
a Y-capacitor circuit comprising at least four capacitances, wherein a first, a second and a third of the four capacitances are connected to a respective one of the phases of the 3-phase supply network, and a fourth of the capacitances is connected to ground.

The invention is in this case based on the idea that, in order to achieve a limit value which is required, for example, by a standard, it is necessary to insert an asymmetrically acting inductance into the network branches. Furthermore, a so-called Y-capacitor circuit is provided in order to damp a radio-frequency range which cannot be influenced by the commutation inductor, and is preferably designed for a frequency range from 2 MHz to about 15 MHz.

Furthermore, the invention makes use of in each case one toroidal inductor, which is likewise connected in the respective phase of the supply network. This is based on the idea that conventional commutation inductors are generally iron-cored inductors, wherein the intrinsically required asymmetric inductance is in fact reduced by the inductor being in the form of an iron-cored inductor. In the proposed invention, a toroidal inductor, preferably a ferrite-cored inductor, is therefore additionally connected in series in each phase of the supply network. These toroidal inductors are preferably designed for a frequency range between 5 and 15 MHz, in conjunction with the Y-capacitor circuit.

In this case, the toroidal inductor preferably has between one and ten turns, in particular three turns.

Trials have shown that numbers of turns such as these are sufficient, and result in the network filter having considerably better characteristics, in comparison to the prior art. In this case, the toroidal inductor preferably has an annular ferrite core.

Furthermore, it is particularly advantageous if connecting lines for connection of the first, second and third capacitances to the three phases of the supply network are arranged on as short a path as possible between the first, second and third capacitances and the three phases.

In this embodiment, undesirable parasitic inductances and/or capacitances from the connecting lines are effectively avoided, and the network filter design is therefore optimized.

As already mentioned initially, the toroidal inductor preferably represents an asymmetrically acting inductance which is inserted into the respective phase of the supply network in series with the commutation inductor. In this case, the ferrite-cored inductor is advantageously in the form of a so-called "current-compensated toroidal inductor", preferably with a ferrite core. In general, the expression current-compensated toroidal inductors means those inductors which have a plurality of identical windings through which the working current flows in opposite directions, thus cancelling out any magnetic field, caused by the working current, in the core of the inductor. This results in particularly effective suppression of so-called common-mode disturbances.

Furthermore, iron-cored inductors are advantageously used as commutation inductors, and ferrite-cored inductors as toroidal inductors.

Known converters often already have iron-based commutation inductors. The connection according to the invention of the ferrite-cored inductors leads in this case, in conjunction with the Y-capacitor circuit, to the network filter having particularly good characteristics, particularly in the radio-frequency range.

In this case, the ferrite-cored inductor is preferably in the form of a current-compensated ferrite-cored inductor.

In one particular preferred embodiment, which relates to the physical design of the network filter, the network filter is mounted on the commutation inductor of the converter.

This results in a particularly advantageous network filter design, with a particularly slimline, compact and cost-effective form. Furthermore, it is possible to comply with limit values which are required despite the relatively simple design and complexity, in particular relating to permissible radio interference voltages.

BRIEF DESCRIPTION OF THE DRAWING

An exemplary embodiment of the invention will be described in more detail in the following text. In the figures.

DETAILED DESCRIPTION OF PREFERRED EMBODIMENTS

Figure 1:
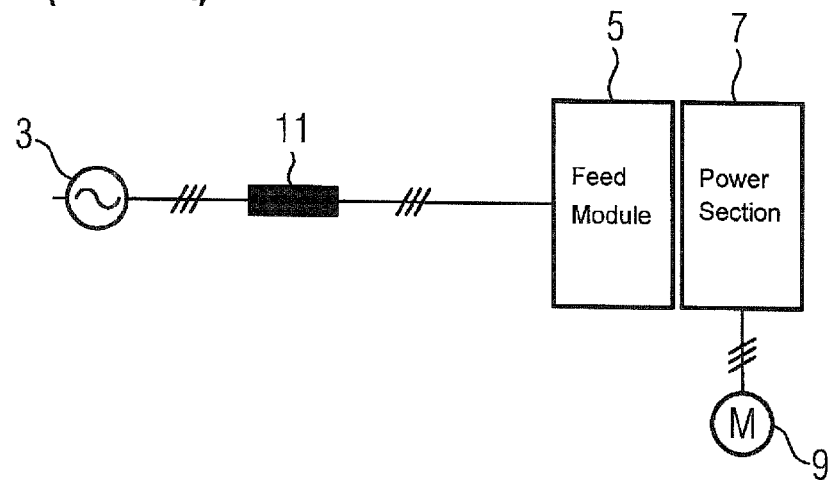
FIG. 1 shows a converter according to the prior art, connected to a supply network by means of a commutation inductor.

FIG. 1 shows a known circuit according to the prior art. In this case, a feed module 5 of a converter is connected to the supply network 3 via a series commutation inductor 11 for each network phase. The commutation inductor 11 in this case provides the network filter which, is intended to keep disturbances that arise in particular in the power section 2 of the converter away from the supply network 3, by attenuating such disturbances. The power section 7 produces a desired voltage amplitude at a desired frequency for a motor 9.

Figure 2:
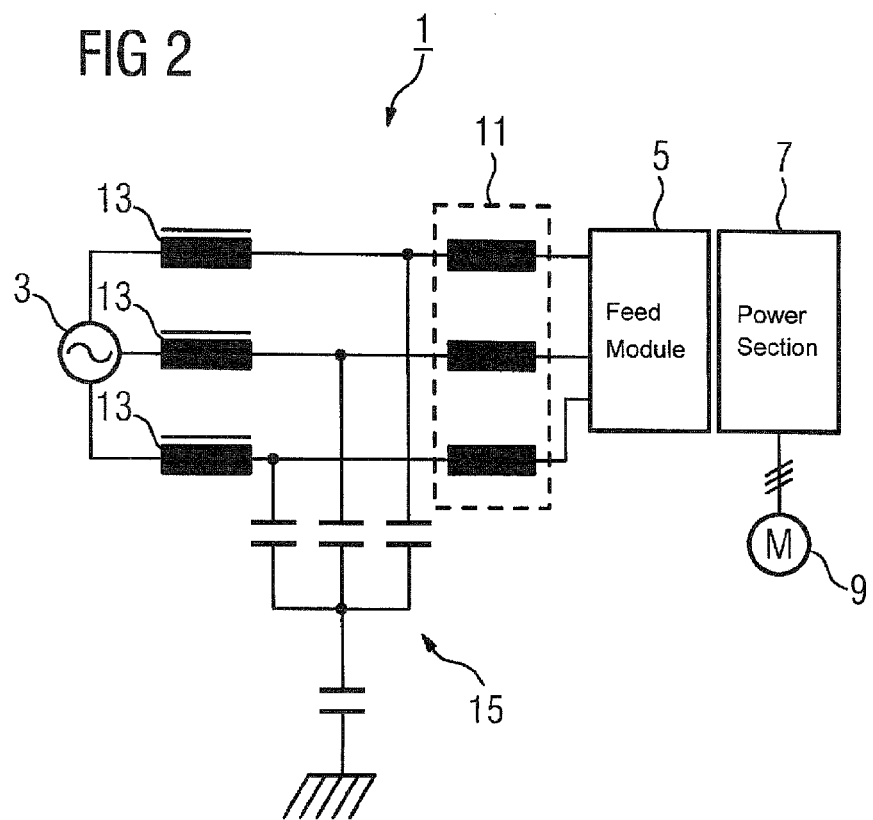
FIG. 2 shows a network filter according to the invention, for connection of a converter to a 3-phase supply network.

FIG. 2 shows a network filter 1 according to the invention.

In this case, a toroidal inductor 13, preferably with a ferrite core, is connected in each phase of the supply network 3 and is in turn connected in series with a commutation inductor 11, which is generally provided in any case, in the converter. A Y-capacitor circuit 15 is used for tuning the network filter to a radio-frequency range outside the frequency range which can be influenced by the inductor or inductors. The network filter 1 is preferably mounted with the toroidal inductor 13 and the Y-capacitor circuit 15 on the commutation inductor 11 of the converter, which leads to a particularly compact and slimline design. The connecting lines between the first, second and third capacitances of the Y-capacitor circuit 15 are kept as short as possible, in order to avoid undesirable parasitic inductances and/or capacitances of the connecting lines.

The toroidal inductors which are connected in the three phases of the supply network are preferably wound on a common ferrite core.

Furthermore, the turns on the toroidal inductor can be formed by connecting lines which are used for connecting the first, second and third capacitances to the three phases of the supply network.

Therefore, in this embodiment, the connecting lines are themselves wound around the toroidal core of the toroidal inductor, and thus provide the turns. In consequence, no separate component is required here for the toroidal inductor, in any case not for the windings.

In summary, the invention can be outlined as follows:

The invention relates to a network filter 1 for a converter for connection of the converter to a 3-phase supply network 3. In this case, one toroidal inductor 13 per phase is connected in series with a commutation inductor 11 of the converter. Furthermore, a Y-capacitor circuit 15 is provided comprising at least four capacitances, wherein a first, a second and a third of the four capacitances are connected to a respective one of the phases of the 3-phase supply network 3, and a fourth of the four capacitances is connected to ground. The network filter 1 is particularly preferably mounted on the commutation inductor 11 of the converter, and the turns of the toroidal inductor 13 are formed by connecting lines, which are used to connect the first, second and third capacitances to the three phases of the supply network 3. The turns of the toroidal inductor 13 for each phase may in this case be wound on a common toroidal core, preferably a ferrite core.

What is claimed is:

1. A network filter for connecting a converter to a 3-phase supply network, comprising:
   in each phase, a toroidal inductor is connected in series with a commutation inductor at a respective first connection point; and
   a capacitor circuit comprising at least four capacitances, wherein first terminals of a first, a second and a third of the four capacitances are connected in one-to-one correspondence to a respective one of the first connection points, and wherein second terminals of the first, second and third capacitance are connected at a common second connection point, and wherein a fourth of the four capacitances is connected between ground and the common second connection point, wherein the commutation inductor comprises an iron core, and the toroidal inductor comprises a ferrite core.

2. The network filter of claim 1, wherein the toroidal inductor has between one and ten turns.

3. The network filter of claim 2, wherein the toroidal inductor has three turns.

4. The network filter of claim 1, wherein the toroidal inductor being inserted into each phase of the supply network represents an asymmetrically acting inductance.

5. The network filter of claim 1, wherein the toroidal inductor is a current-compensated toroidal inductor.

6. The network filter of claim 1, wherein the network filter is mounted on the commutation inductor.

7. The network filter of claim 1, wherein the first connection point in a phase is connected to a corresponding first terminal of the first, second or third capacitance by a connecting line, with the connecting line forming turns of the corresponding toroidal inductor in that phase.

8. A network filter for connecting a converter to a 3-phase supply network, comprising:
   in each phase, a toroidal inductor is connected in series with a commutation inductor at a respective first connection point; and
   a capacitor circuit comprising at least four capacitances, wherein first terminals of a first, a second and a third of the four capacitances are connected in one-to-one correspondence to a respective one of the first connection points, and wherein second terminals of the first, second and third capacitance are connected at a common second connection point, wherein a fourth of the four capacitances is connected between around and the common second connection point, and wherein the first connection points in each phase are connected to the corresponding first terminals of the first, second and third capacitances by way of connecting lines have a shortest possible length.

* * * * *

UNITED STATES PATENT AND TRADEMARK OFFICE
CERTIFICATE OF CORRECTION

PATENT NO. : 8,680,949 B2  
APPLICATION NO. : 12/599884  
DATED : March 25, 2014  
INVENTOR(S) : Alfred Böhm (deceased) and Tobias Hofmann Page 1 of 1

It is certified that error appears in the above-identified patent and that said Letters Patent is hereby corrected as shown below:

On the Title Page

Item (75) Inventors; add "(deceased)" after first inventor "Alfred Böhm"
--Alfred Böhm (deceased)--

Page 2; item (56) Foreign Patent Documents:
correct cited document "JP 2600-340437 A" to --JP 2000-340437 A--

Signed and Sealed this
Twenty-first Day of October, 2014

Michelle K. Lee
*Deputy Director of the United States Patent and Trademark Office*